United States Patent [19]

Branover

[11] 4,171,707

[45] Oct. 23, 1979

[54] METHOD AND APPARATUS FOR CONTROLLING THE FLOW OF LIQUID METAL

[75] Inventor: Herman Branover, Beer Sheva, Israel

[73] Assignee: Ben-Gurion University of the Negev, Research and Development Authority, Beer Sheva, Israel

[21] Appl. No.: 790,858

[22] Filed: Apr. 25, 1977

[51] Int. Cl.² .............................................. G05D 7/00
[52] U.S. Cl. ...................................... 137/13; 137/827
[58] Field of Search ................. 137/DIG. 10, 13, 827; 417/50

[56] References Cited

U.S. PATENT DOCUMENTS

| 2,741,984 | 4/1956 | Lindenblad | 417/50 |
|---|---|---|---|
| 3,045,599 | 7/1962 | Carlson, Jr. et al. | 417/50 |
| 3,390,693 | 7/1968 | Ziemer et al. | 137/827 X |
| 3,459,205 | 8/1969 | Ziemer et al. | 137/827 X |
| 3,575,804 | 4/1971 | Ripley | 137/827 X |
| 3,701,357 | 10/1972 | Granstrom et al. | 137/827 |
| 3,706,399 | 12/1972 | Sundberg | 417/50 X |
| 3,785,744 | 1/1974 | Carbonnel | 417/50 |
| 3,787,143 | 1/1974 | Carbonnel et al. | 417/50 |

*Primary Examiner*—William R. Cline
*Attorney, Agent, or Firm*—J. Harold Nissen

[57] ABSTRACT

There is provided a method and apparatus for controlling the flow of liquid metal in a tubular conduit of elongated cross-section by means of an external magnetic field. The method comprises providing means for applying a magnetic field adapted to traverse the flow path of said fluid wherein the orientation of the magnetic field relative said conduit is adapted to be varied and varying said field direction in order to control the flow of liquid metal in said conduit whereby when a magnetic field is applied in a direction traversing the elongated wall sections of said conduit the rate of flow is decreased and when a magnetic field is applied in a direction traversing the shorter wall sections of said conduit the rate of flow is increased. The apparatus comprises a tubular conduit of elongated cross-sectional shape adapted to conduct a liquid metal therethrough and means for applying a magnetic field adapted to traverse the flow path of said fluid wherein the orientation of the magnetic field relative to said conduit is adapted to be varied.

9 Claims, 3 Drawing Figures

METHOD AND APPARATUS FOR CONTROLLING THE FLOW OF LIQUID METAL

The present invention relates to a method and apparatus for controlling the flow of liquid metal. More particularly the present invention relates to the control of the flow of liquid metal in a tubular conduit of elongated cross-section by means of an external magnetic field.

As is known in the many industrial fields involved in producing, casting and working with metal wherein at one or more processing stages the metal is in liquid form, it is extremely important and desirable to be able to control and vary the rate of flow of said liquid metal.

Heretofor all control means for such liquid flow were valve and/or stopper means which came in direct contact with the flowing liquid metal and which consequently were subject to the wear and deterioration caused thereby.

Since in most cases liquid metal is processed at very high temperatures such as in the steel and aluminum industry, as well as in other industrial processes involving the use of molten metal and metal alloys for casting and other purposes, the problem of finding valves and stoppers of suitable material to withstand the high heat of said molten metal and to properly function despite the expansion and contraction accompanying the changes in temperatures to which said parts are subject is especially acute.

For these reasons the cost of said valves and stoppers is high and their rate of attrition and replacement is also great thereby introducing a high cost factor into said prior art flow rate control means.

It is therefore an object of the present invention to solve this long outstanding problem and to provide inexpensive and effective liquid flow control means for controlling the flow of liquid metal, which means are external the flow path of the liquid metal and consequently are not subject to the wear and deterioration normally caused by direct contact with the flowing liquid metal.

According to the present invention it has now been discovered that the rate of flow of a liquid metal in a conduit of elongated cross-section can both be increased and decreased solely by means of the controlled and directed application of a magnetic field across the flow path of said liquid metal and that this method of control can be applied industrially to control the flow of liquid metal in tubular conduits.

Thus the hereinbefore mentioned and other objects which will be apparent from the specification and claims, are accomplished in accordance with the present invention which is directed to and provides a method for controlling the flow of liquid metal in a tubular conduit of elongated cross-section comprising providing means for applying a magnetic field adapted to traverse the flow path of said fluid wherein the orientation of the magnetic field relative said conduit is adapted to be varied and varying said field direction in order to control the flow of liquid metal in said conduit whereby when a magnetic field is applied in a direction traversing the elongated wall sections of said conduit the rate of flow is decreased and when a magnetic field is applied in a direction traversing the shorter wall sections of said conduit the rate of flow is increased.

In accordance with the present invention there is also provided an apparatus for controlling the flow of liquid metal in a tubular conduit comprising a tubular conduit of elongated cross-sectional shape adapted to conduct a liquid metal therethrough and means for applying a magnetic field adapted to traverse the flow path of said fluid wherein the orientation of the magnetic field relative said tube is adapted to be varied.

The method of the present invention can be carried out in various ways involving different apparatus and arrangements. Thus according to one preferred embodiment of the present invention the method comprises positioning at least one pair of interfacing permanent magnet poles of opposite polarity on opposite sides of said conduit and shifting said pair of poles between positions adjacent said shorter walls and positions adjacent said elongated walls of said conduit whereby the rate of flow in said conduit is varied.

In yet another preferred embodiment of the present invention the method comprises positioning at least two pairs of electromagnets, each pair comprising two interfacing electromagnets bodies of opposite polarity, on opposite sides of said conduit wherein one pair of electromagnets is positioned adjacent the shorter walls of said conduit and the other pair of electromagnets is positioned adjacent said elongated walls of said conduit and varying the intensities of the electromagnetic fields of said electro magnets whereby the rate of flow in said conduit is varied.

While the invention will now be described in connection with certain preferred embodiments with reference to the following illustrative figures so that it may be more fully understood, it is stressed that the particulars shown and described are by way of example and for purposes of illustrative discussion only and are presented in the cause of providing what is believed to be the most useful and readily understood description of the principles and conceptual aspects of the invention. In this regard no attempt is made to show structural details of the apparatus and its constituent parts in more detail than is necessary for a fundamental understanding of the invention, the description taken with the drawings making apparent to those skilled in the art how the several forms of the invention may be embodied in practice.

Figure 1:
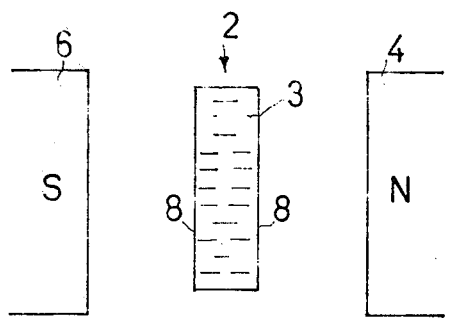
FIG. 1 is a schematic illustration of control apparatus according to the present invention with a pair of permanent magnet poles arranged in relation to a rectangular conduit in a flow decreasing position.

Referring generally to the Figures wherein equivalent parts have been assigned the same unit numbers it will be noted that the figures constitute schematic representations of different types of apparatus for controlling the flow of liquid metal in a tubular conduit comprising a tubular conduit e.g. 2 or 12 of elongated cross-sectional shape adapted to conduct a liquid metal 3 therethrough and means e.g. 4 and 6 or 14 and 16 applying a magnetic field adapted to traverse the flow path of said fluid wherein the orientation of the magnetic field relative said conduit is adapted to be varied as described in detail hereinafter.

More particularly said respective magnetic field generating means 4 and 6 or 14 and 16 are adapted to apply a magnetic field in a direction traversing the long wall sections 8, 18 of said conduit 2,12 whereby the rate of flow in said conduit is decreased and are further adapted to apply a magnetic field in a direction traversing the shorter wall sections 10,20 of said conduit whereby the rate of flow in said conduit is increased as will be explained hereinafter.

Referring specifically first to FIG. 1 there is schematically illustrated a tubular conduit 2 of elongated cross-sectional shape, wherein said conduit is of substantially rectangular cross-section, and a pair of interfacing permanent magnetic poles 4 and 6 of opposite polarity positioned on opposite sides of said conduit 2 adjacent the elongated walls 8 of said conduit.

Figure 2:
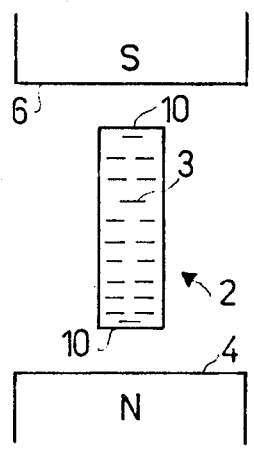
FIG. 2 is a schematic illustration of the control apparatus of FIG. 1 with a pair of permanent magnet poles arranged in relation to a rectangular conduit in a flow increasing position.

Referring now to FIG. 2 there is schematically illustrated the tubular conduit of FIG. 1 wherein the pair of interfacing permanent magnetic poles 4 and 6 of opposite polarity have been shifted and positioned adjacent the shorter walls 10 of said conduit.

It will be realized that said pair of magnetic poles 4 and 6 can be the opposite poles of different magnets or in fact can be the two poles of a large horseshoe shaped magnet straddling said conduit.

Said magnetic poles 4 and 6 are attached to means not shown adapted for shifting said pair of magnet poles between positions adjacent the shorter walls of the conduit as shown in FIG. 2 and positions adjacent the elongated walls of said conduit as illustrated in FIG. 1 to achieve the desired flow control effect discussed hereinafter with reference to said Figures.

In experiments with turbulent mercury flows in rectangular conduits influenced by magnetic fields it was discovered that in channels with high aspect ratio cross sections, i.e., conduits of elongated cross-section there is a basic difference in how the field influences pressure losses in the following two cases:

(a) Hartmann type flow (see FIG. 1); and
(b) The flow in an azimuthal field (see FIG. 2).

In Hartmann type flow when the external magnetic field is perpendicular to the bigger side of cross section the friction factor $\lambda$ of a turbulent flow is always increasing (for Reynolds numbers higher than 2500) up to the point of complete laminarization of the flow (which occurs at $(Ha/Re)=4.6\cdot10^{-3}$, where $RE=(UL/\nu)$ and is the Reynolds number and $Ha=BL\sqrt{\sigma/\rho\nu}$ and is the Hartmann number. Thus where $\lambda$-friction factor;
Ha-Hartman number;
Re-Reynolds number;
U-average velocity of flow of liquid;
L-half width of channel;
$\nu$-viscosity;
B-magnetic field induction;
$\sigma$-conductivity;
$\rho$-density;
$\lambda_H$-friction factor in presence of magnetic field; and
$\lambda_o$-friction factor in absence of magnetic field a suggested semi-empirical expression for $\lambda$ when the external magnetic field is perpendicular to the elongated walls of said conduit could be:

$$\lambda = \lambda_H + (\lambda_o - \frac{6}{Re}) \left[ \frac{\lambda_H - 0.00935}{6/Re - 0.00935} \right]^{1 + (1 - \frac{2500}{Re})/2}$$

where

-continued
$$\lambda_H = \frac{2Ha}{Re}$$
$$\lambda_o = \frac{0.056}{Re^{0.25}}$$

In an azimuthal field as illustrated in FIG. 2, however the flow has been found to differ from the flow in FIG. 1 as a result of the fact that the magnetic field is parallel to the bigger side of the cross section.

Here the friction factor of a turbulent flow has been found to always decrease up to flow laminarization which occures at $Ha/Re = 7.4\cdot10^{-3}$.

Thus for $\lambda$ in this case there is suggested the following empirical expression:

$$\lambda = \lambda_o [1 - 1600(\frac{Ha}{Re})^{1.6}]$$

In light of said findings and calculations it will be realized that at practically available fields and reasonable Reynolds number friction factors a flow rate change of about 35–40% can be achieved merely by shifting the external magnetic field generated, e.g., by permanent magnets between the positions shown in FIGS. 1 and 2 and positions thereinbetween.

Thus, e.g., in a rectangular conduit having a height of 5cm and a width of 2cm the flow of steel, copper and aluminum can be controlled by the application of magnet fields in the range of about 2000 to 3000 gauss, while in the same size conduit the flow of liquid sodium can be controlled by the application of a reduced magnetic field of lesser strength, e.g., about 1000 gauss. The corresponding change in the flow rate will naturally depend on the relative impact in pressure losses of the conduit under consideration in comparison with other parts of the pipeline system, however nevertheless the present invention provides a method and apparatus ideally suited for controlling the flow of liquid metal in many industrial processes in a simple, efficient and inexpensive manner.

Figure 3:
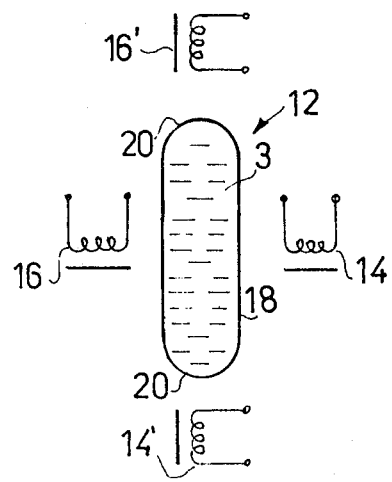
FIG. 3 is a schematic illustration of a different embodiment of control apparatus according to the present invention with two pairs of electromagnets arranged around an oval conduit.

Now that the invention and its basis is more clearly understood reference is had to FIG. 3 in which a different embodiment of the present invention is illustrated.

Referring now to FIG. 3 there is schematically illustrated apparatus according to the present invention wherein there is provided a tubular conduit 12 of substantially oval cross-section adapted to conduct the liquid metal 3 therethrough and wherein the means for applying a magnetic field comprise at least two pairs 14,16 and 14',16' of electromagnets each pair (14,16 and 14',16' respectively) comprising two interfacing electromagnetic bodies of opposite polarity positioned on opposite sides of said conduit wherein one pair of electromagnets 14,16 is positioned adjacent the elongated walls 18 of said conduit and the other pair of electromagnets 14',16' is positioned adjacent the shorter walls 20 of said conduit.

In the presently described embodiment it is unnecessary to shift the electromagnets and simply by varying the intensities of the electromagnetic fields of said electromagnets the rate of flow in said conduit can be varied and controlled.

Thus, e.g., when electromagnets 14 and 16 are turned on and electromagnets 14' and 16' turned off the flow rate is decreased while whe electromagnets 14' and 16' are turned on and electromagnets 14 and 16 are turned off the normal flow rate in said conduit is increaased. In a similar manner by adjusting and varying the relative intensities of the fields it is possible to achieve different degrees of rate increase and decrease.

While particular embodiments of the invention have been described with reference to the figures it will be evident to those skilled in the art that the present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for controlling the turbulent flow of a liquid metal, having a Reynolds number higher than 2500, in a tubular conduit comprising:
   providing a tubular conduit of elongated cross-section;
   providing at least one pair of interfacing static magnetic field producing means;
   positioning said pair on substantially opposite sides of said conduit; and
   applying said static magnetic field to traverse the flow path of said liquid metal;
   whereby when a magnetic field is applied in a direction traversing the elongated wall sections of said conduit a static magnetic field is produced so that the rate of flow is decreased and when a magnetic field is applied in a direction traversing the shorter wall sections of said conduit a static magnetic field is produced so that the rate of flow is increased.

2. The method according to claim 1 wherein said pair of interfacing magnetic field producing means is a pair of permanent magnet poles of opposite polarity and wherein said poles are adapted to be shifted between a first position adjacent to the long wall sections of said conduit and a second position adjacent to the shorter wall sections of the conduit.

3. The method according to claim 1 comprising:
   providing two pairs of interfacing static field producing means wherein each of said pair of interfacing magnetic field producing means is a pair of electromagnetic means positioned on opposite sides of said conduit; and
   selectively varying the intensities of the static electromagnetic fields of said electromagnets whereby the rate of flow of said liquid is controlled.

4. The method according to claim 3, wherein said poles in said first position thereof are permanent magnet poles which produce a static magnetic field across the short wall sections of said conduit.

5. The method according to claim 1, wherein turbulent flowing liquid is conducted throught the tubular conduit and the rate of turbulent flow is varied in accordance with the intensity of the static magnetic field applied across the elongated wall sections and the shorter wall sections, and said interfacing magnetic field producing means provides a constant magnetic field which changes the turbulent flow into a laminar flow.

6. Apparatus for controlling the turbulent flow of a liquid metal, having a Reynolds number higher than 2500, in a tubular conduit comprising:
   a tubular conduit of elongated cross-section;
   a pair of interfacing magnetic poles of opposite polarity positioned on substantially opposite sides of said conduit and adapted to produce a static magnetic field capable of traversing the flow path of said liquid; and
   means for shifting said poles between a first position adjacent to the long wall sections of said conduit and a second position adjacent to the shorter wall sections of the conduit;
   whereby when a static magnetic field is applied in a direction traversing the elongated wall sections of said conduit the rate of flow is decreased and when a static magnetic field is applied in a direction traversing the shorter wall sections of said conduit the rat of flow is increased.

7. Apparatus according to claim 6 wherein said conduit is of substantially rectangular cross-section.

8. Apparatus according to claim 6, including means for flowing the liquid metal through said tubular conduit with a turbulent flow, and said interfacing magnetic poles are permanent magnets which cooperate to change the turbulent flow of the liquid metal into a laminar flow.

9. Apparatus as claimed in claim 6 wherein each said pairs of electromagnetic field producing means includes a pair of oppositely poled permanent magnets positioned on opposite sides of said conduit, external thereof.

* * * * *